(12) United States Patent
Diaconescu et al.

(10) Patent No.: US 8,762,131 B1
(45) Date of Patent: Jun. 24, 2014

(54) SYSTEMS AND METHODS FOR MANAGING A COMPLEX LEXICON COMPRISING MULTIWORD EXPRESSIONS AND MULTIWORD INFLECTION TEMPLATES

(75) Inventors: Stefan Stelian Diaconescu, Bucharest (RO); Marius Mateescu, Bucharest (RO); Andrei Minca, Slatina (RO); Gabriel Masei, Carcaliu (RO); Bianca-Daniela Paun, Bucharest (RO)

(73) Assignee: Softwin SRL Romania, Bucharest (RO)

( * ) Notice: Subject to any disclaimer, the term of this patent is extended or adjusted under 35 U.S.C. 154(b) by 1069 days.

(21) Appl. No.: 12/486,629

(22) Filed: Jun. 17, 2009

(51) Int. Cl.
*G06F 17/27* (2006.01)
*G06F 17/21* (2006.01)
*G06F 17/28* (2006.01)

(52) U.S. Cl.
USPC .................................. 704/9; 704/10; 704/7

(58) Field of Classification Search
USPC ....................................................... 704/1–10
See application file for complete search history.

(56) References Cited

U.S. PATENT DOCUMENTS

| | | | |
|---|---|---|---|
| 4,586,160 A | 4/1986 | Amano |
| 4,594,686 A | 6/1986 | Yoshida |
| 4,641,264 A | 2/1987 | Nitta |
| 4,706,212 A | 11/1987 | Toma |
| 4,724,523 A | 2/1988 | Kucera |
| 4,783,761 A | 11/1988 | Gray |
| 4,864,501 A | 9/1989 | Kucera et al. |
| 4,887,212 A | 12/1989 | Zamora |
| 4,914,590 A | 4/1990 | Loatman |
| 4,916,614 A | 4/1990 | Kaji |
| 4,980,829 A | 12/1990 | Okajima |
| 4,994,966 A | 2/1991 | Hutchins |
| 5,060,155 A | 10/1991 | Van Zuijlen |
| 5,088,038 A | 2/1992 | Tanaka et al. |
| 5,251,129 A | 10/1993 | Jacobs et al. |
| 5,323,316 A | 6/1994 | Kadashevich |

(Continued)

FOREIGN PATENT DOCUMENTS

| EP | 0012777 A1 | 7/1980 |
|---|---|---|
| EP | 0230340 A2 | 7/1987 |

(Continued)

OTHER PUBLICATIONS

Diaconescu, S. et al, "Complex Natural Language Processing System Architecture," (2007), Advances in Spoken Language Technology, The Publishing House of the Romanian Academy, Bucharest 2007.*

(Continued)

*Primary Examiner* — Angela A Armstrong
(74) *Attorney, Agent, or Firm* — Law Office of Andrei D Popovici, PC

(57) ABSTRACT

In some embodiments, linguistic knowledge bases including multiword lexicon entries belonging to various natural languages are generated and maintained. Multiword lexicon entries include representations of multiword expressions (e.g. composite words such as "expectation value", verbal phrases such as "to stumble upon", and idiomatic phrases such as "to hit the nail on the head"), and multiword inflection templates (e.g. "more adjective" as a symbolic representation for the comparative form of adjectives). A representation of a multiword lexicon entry, including a dependency tree and/or an attribute-value tree, is displayed within a graphical user interface, allowing a user to verify, update, and correct lexical data. Computer-readable encodings (e.g. XML) of dependency tree and/or attribute-value tree data are saved as part of each lexicon entry.

14 Claims, 21 Drawing Sheets

(56) References Cited

U.S. PATENT DOCUMENTS

| | | | |
|---|---|---|---|
| 5,369,576 A | 11/1994 | Heemels et al. | |
| 5,442,546 A | 8/1995 | Kaji | |
| 5,528,491 A | 6/1996 | Kuno | |
| 5,559,693 A | 9/1996 | Anick et al. | |
| 5,642,519 A | 6/1997 | Martin | |
| 5,659,765 A | 8/1997 | Nii | |
| 5,748,841 A | 5/1998 | Morin | |
| 5,983,169 A | 11/1999 | Kozma | |
| 5,991,712 A | 11/1999 | Martin | |
| 6,101,492 A | 8/2000 | Jacquemin et al. | |
| 6,243,669 B1 | 6/2001 | Horiguchi | |
| 6,332,118 B1 | 12/2001 | Yamabana | |
| 6,676,412 B1 | 1/2004 | Masterson et al. | |
| 6,937,975 B1 | 8/2005 | Elworthy | |
| 7,013,264 B2 | 3/2006 | Dolan | |
| 7,050,964 B2 | 5/2006 | Menzes | |
| 7,085,708 B2 | 8/2006 | Manson | |
| 7,136,807 B2 | 11/2006 | Mueller | |
| 7,167,824 B2 | 1/2007 | Kallulli | |
| 7,324,936 B2 | 1/2008 | Saldanha et al. | |
| 7,565,281 B2 * | 7/2009 | Appleby | 704/2 |
| 7,698,124 B2 | 4/2010 | Menezes et al. | |
| 2002/0013694 A1 | 1/2002 | Murata | |
| 2002/0026308 A1 | 2/2002 | Osborne | |
| 2002/0042707 A1 | 4/2002 | Zhao | |
| 2003/0023423 A1 | 1/2003 | Yamada | |
| 2003/0233226 A1 | 12/2003 | Kim | |
| 2004/0153305 A1 | 8/2004 | Enescu | |
| 2004/0172237 A1 | 9/2004 | Saldanha | |
| 2004/0230418 A1 | 11/2004 | Kitamura | |
| 2004/0243387 A1 | 12/2004 | De Brabander | |
| 2004/0243396 A1 | 12/2004 | Liu et al. | |
| 2005/0091031 A1 | 4/2005 | Powell et al. | |
| 2005/0091036 A1 | 4/2005 | Shackleton | |
| 2006/0009962 A1 | 1/2006 | Monk | |
| 2006/0200336 A1 | 9/2006 | Cipollone | |
| 2006/0200338 A1 | 9/2006 | Cipollone et al. | |
| 2007/0010994 A1 | 1/2007 | Mueller | |
| 2007/0233460 A1 | 10/2007 | Lancaster et al. | |
| 2008/0235199 A1 | 9/2008 | Li et al. | |
| 2009/0006078 A1 | 1/2009 | Selegey et al. | |

FOREIGN PATENT DOCUMENTS

| | | |
|---|---|---|
| EP | 0241717 A2 | 10/1987 |
| EP | 0262938 A1 | 4/1988 |
| EP | 0274281 A1 | 7/1988 |
| EP | 0357370 A2 | 3/1990 |
| EP | 0381288 A1 | 8/1990 |
| EP | 0387960 A1 | 9/1990 |
| EP | 0409425 A2 | 1/1991 |
| EP | 0199464 B1 | 8/1991 |
| EP | 0466516 A2 | 1/1992 |
| EP | 0562818 A2 | 9/1993 |
| EP | 0168814 B1 | 5/1994 |
| EP | 0266001 B1 | 5/1995 |
| EP | 0244871 B1 | 2/1996 |
| EP | 0388156 B1 | 9/1997 |
| EP | 0805403 A2 | 11/1997 |
| EP | 0524694 B1 | 7/1999 |
| EP | 0651340 B1 | 12/1999 |
| EP | 0424032 B1 | 3/2000 |
| EP | 0525470 B1 | 4/2000 |
| EP | 1022662 A1 | 7/2000 |
| EP | 1109110 A9 | 6/2001 |
| EP | 0825531 B1 | 5/2002 |
| EP | 1209560 A1 | 5/2002 |
| EP | 0532338 B1 | 8/2002 |
| EP | 1262880 A2 | 12/2002 |
| EP | 1271340 A1 | 1/2003 |
| EP | 1349079 A1 | 10/2003 |
| EP | 1080424 B1 | 7/2006 |
| JP | 59032062 | 2/1984 |
| JP | 3276367 | 12/1991 |
| JP | 7152767 | 6/1995 |
| WO | 8805946 A1 | 8/1988 |
| WO | 9740452 A1 | 10/1997 |
| WO | 9962002 A1 | 12/1999 |

OTHER PUBLICATIONS

USPTO, Office Action mailed Oct. 17, 2011 for U.S. Appl. No. 12/109,885, filed Apr. 25, 2008.

Diaconescu et al., U.S. Appl. No. 12/109,885, filed Apr. 25, 2008.

Diaconescu et al., U.S. Appl. No. 12/486,546, filed Jun. 17, 2009.

Diaconescu et al., U.S. Appl. No. 12/486,597, filed Jun. 17, 2009.

USPTO, Office Action mailed May 24, 2012 for U.S. Appl. No. 12/486,546, filed Jun. 17, 2009, first inventor Diaconescu, S.S.

USPTO, Office Action mailed May 24, 2012 for U.S. Appl. No. 12/486,597, filed Jun. 17, 2009, first inventor Diaconescu, S.S.

Diaconescu, S., Natural Language Agreement Description for Reversible Grammars, in Tamás D. Gedeon, Lance Chun Che Fung (Eds.), AI 2003: Advances in Artificial Intelligence, 16th Australian Conference on AI, Perth, Australia, Dec. 2003, Proceedings, pp. 161-172.

Diaconescu, S., Natural Language Processing Using Generative Indirect Dependency Grammar, in Mieczyslav A. Klopotek, Slawomir T. Wierzchon, Krzysztof Trojanowski (Eds), Intelligent Information Processing and Web Mining, Proceedings of the International IIS: IIPWM'04 Conference, Zakopane, Poland, May 17-20, 2004, Springer, pp. 414-418.

Diaconescu, S., Natural Language Understanding Using Generative Dependency Grammar, in Max Bramer, Alun Preece and Frans Coenen (Eds), ES 2002. Research and Development in Intelligent Systems XIX, Proceedings of ES2002, the Twenty second SGAI International Conference on Knowledge Based Systems and Applied Artificial Intelligence, Cambridge UK, Dec. 2002, Springer, pp. 439-452.

Diaconescu, S., Some Properties of the Attribute Value Trees Used for Linguistic Knowledge Representation, in 2nd Indian International Conference on Artificial Intelligence (IICAI-05) INDIA during Dec. 20-22, 2005.

Diaconescu, S., Morphological Categorization Attribute Value Trees and XML, in Mieczyslav A. Klopotek, Slawomir T. Wierzchon, Kryzstof Trojanowski (Eds), Intelligent Information Processing and web Mining, Proceedings of the International IIS: IIPWM '03 Conference, Zakopane, Poland, Jun. 2-5, 2003, Springer, pp. 131-138.

Diaconescu, S., Multiword Expression Translation Using Generative Dependency Grammar, in proceedings of ESTAL 2004—Espana for Natural Language Processing, Oct. 20-22, 2004, Alicante, Spain.

Diaconescu, S.,General System for Normal and Phonetic Inflection, in Corneliu Burileanu, Horia-Nicolai Teodorescu (Eds.), From Speech Processing to Spoken Language Technology, The Publishing House of the Romanian Academy, Bucharest 2009, pp. 149-160.

Diaconescu, S., Natural Language Syntax Description using Generative Dependency Grammar, POLIBITS, No. 38, Jul.-Dec. 2008, ISSN:1870-9044, pp. 5-18.

Diaconescu, S., Complex Natural Language Processing System Architecture, in Corneliu Burileanu, Horia-Nicolai Teodorescu (Eds.), Advances in Spoken Language Technology, The Publishing House of the Romanian Academy, Bucharest 2007, pp. 228-240.

Diaconescu, S., Crearea resurselor lingvistice cu ajutorul unui limbaj specializat, in Workshop on Linguistic Resources and Tools for Romanian Language Processing, Iasi, Nov. 2006.

Diaconescu, S., Grammar Abstract Language Basics, In GEST International Transaction on Computer Science and Engineering, vol. 10, No. 1, 2005.

* cited by examiner

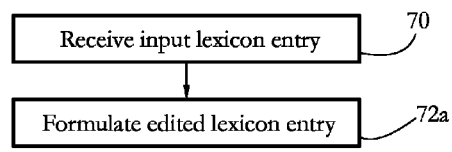
FIG. 7-A
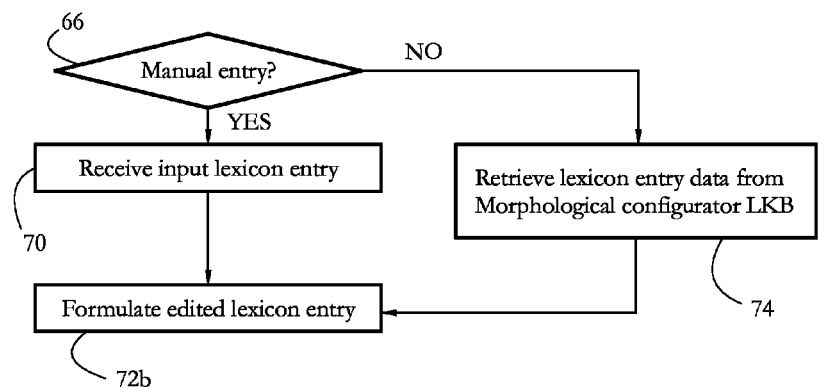
FIG. 7-B

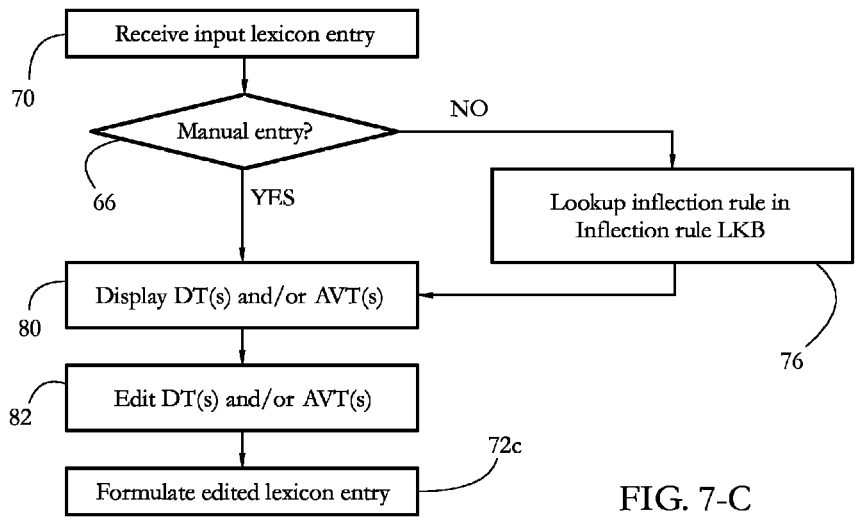
FIG. 7-C
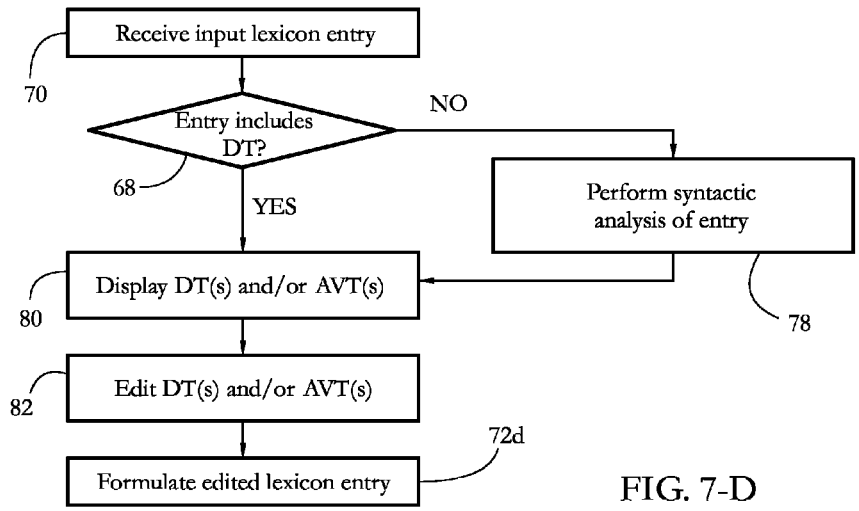
FIG. 7-D

```
<?xml version="1.0" encoding = "unicode"?>
<!DOCTYPE Lexicon SYSTEM "Lexicon.dtd">
<Lexicon sourceLanguage = "RUM" exploitationLanguage = "RUM"
sourceDirection = "right" exploitationDirection = "right">
 <entry label="Entry0006" type="MWE">
  <multiword>
   <text>
    <normal>a bate la cap pe cineva</normal>
    <phonetic>a b'ate l'a k'ap p'e ʧine'va</phonetic>
   </text>
   <semantics>
    <gloss>a cicali, a plictisi pe cineva cu vorba</gloss>
   </semantics>
   <tri index="1" where="left"></tri>

<syntacticSection>
    <TA label="L1" name="a bate" taType="T" type="P">
     <attribute name="class"><value name="verb"></value>
     </attribute>
     <attribute name="conjugation"><value name="III"></value>
     </attribute>
     <attribute name="personal or impersonal"><value name="personal">
         </value>
     </attribute>
     <attribute name="reflexivity"><value name="nonreflexive"></value>
     </attribute>
     <attribute name="predicativity"><value name="predicative"></value>
     </attribute>
     <attribute name="transitivity"><value name="transitive"></value>
     </attribute>
     <attribute name="diathesis"><value name="active"></value>
     </attribute>
     <attribute name="mode"><value name="infinitive"></value>
     </attribute>
     <attribute name="time"><value name="present"></value>
     </attribute>
     <attribute name="infinitive form"><value name="with preposition">
         </value>
     </attribute>

<governor>
      <relationalLabel>R1</relationalLabel>
      <relationalLabel>R2</relationalLabel>
     </governor>
    </TA>
```

FIG. 9-A

```xml
<TA label="L2" name="cap" taType="T" type="I">
 <attribute name="class"><value name="noun"></value>
 </attribute>
 <attribute name="type"><value name="common"></value>
 </attribute>
 <attribute name="animation"><value name="inanimate"></value>
 </attribute>
 <attribute name="gender"><value name="neutral"></value>
 </attribute>
 <attribute name="number"><value name="singular"></value>
 </attribute>
 <attribute name="case"><value name="accusative"></value>
 </attribute>
 <attribute name="articulation"><value name="nonarticulate"></value>
 </attribute>
 <subordinate>
  <relationalLabel>R1</relationalLabel>
 </subordinate>
</TA>

<TA label="L3" name="cineva" taType="T" type="T">
 <subordinate>
  <relationalLabel>R2</relationalLabel>
 </subordinate>
</TA>
</syntacticSection>

<dependencySection>
 <subordinateRelation label="R1" name="rel_verb-complement_la">
 </subordinateRelation>
 <subordinateRelation label="R2" name="rel_verb-complement_direct-pe">
 </subordinateRelation>
</dependencySection>
</multiword>

</entry>
</Lexicon>
```

FIG. 9-B

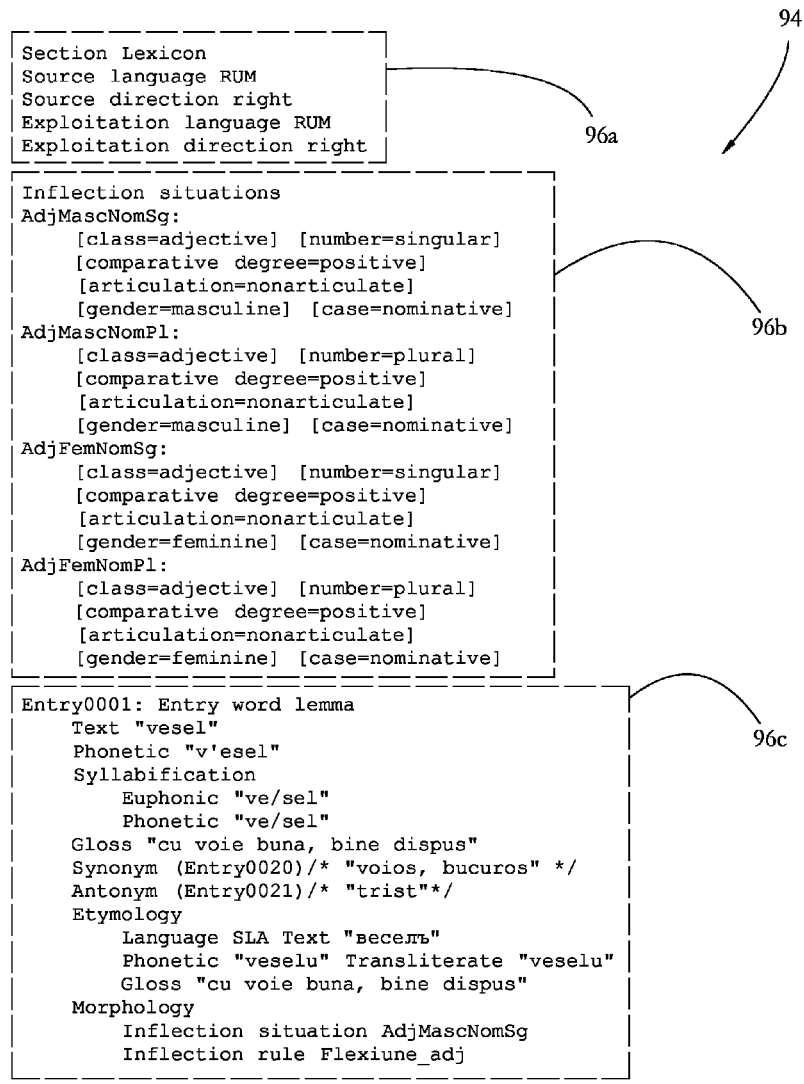
FIG. 10-A

```
┌─────────────────────────────────────────────┐
│ Supplement                                  │
│     Text "veselă" Phonetic "v'eselə"        │
│     Number 2                                │  ╲
│     Syllabification                         │   ╲ 96d
│         Euphonic "v'e/se/lə"                │
│         Phonetic "v'e/se/lə"                │
│     Morphology                              │
│         Inflection situation AdjFemNomSg    │
└─────────────────────────────────────────────┘
  Supplement
      Text "veseli" Phonetic "v'eselʲ"
      Number 3
      Syllabification
          Euphonic "v'e/selʲ"
          Phonetic "v'e/selʲ"
      Morphology
          Inflection situation AdjMascNomPl
  Supplement
      Text "vesele" Phonetic "v'esele"
      Number 4
      Syllabification
          Euphonic "v'e/se/le"
          Phonetic "v'e/se/le"
      Morphology
          Inflection situation AdjFemNomPl
  Marker xxyyzz
end of entry
end of section
```

FIG. 10-B

```xml
<?xml version="1.0" encoding = "unicode"?>
<!DOCTYPE Lexicon SYSTEM "Lexicon.dtd">
<Lexicon sourceLanguage = "RUM" exploitationLanguage = "RUM"
sourceDirection =    "right" exploitationDirection = "right">
 <inflectionSituations>
  <situation label="AdjMascNomSg">
   <av attribute="class" value="adjective"></av>
   <av attribute="comparative degree" value="positive"></av>
   <av attribute="articulation" value="nonarticulate"></av>
   <av attribute="gender" value="masculine"></av>
   <av attribute="case" value="nominative"></av>
   <av attribute="number" value="singular"></av>
  </situation>
  <situation label="AdjMascNomPl">
   <av attribute="class" value="adjective"></av>
   <av attribute="comparative degree" value="positive"></av>
   <av attribute="articulation" value="nonarticulate"></av>
   <av attribute="gender" value="masculine"></av>
   <av attribute="case" value="nominative"></av>
   <av attribute="number" value="plural"></av>
  </situation>
  <situation label="AdjFemNomSg">
   <av attribute="class" value="adjective"></av>
   <av attribute="comparative degree" value="positive"></av>
   <av attribute="articulation" value="nonarticulate"></av>
   <av attribute="gender" value="feminine"></av>
   <av attribute="case" value="nominative"></av>
   <av attribute="number" value="singular"></av>
  </situation>
  <situation label="AdjFemNomPl">
   <av attribute="class" value="adjective"></av>
   <av attribute="comparative degree" value="positive"></av>
   <av attribute="articulation" value="nonarticulate"></av>
   <av attribute="gender" value="feminine"></av>
   <av attribute="case" value="nominative"></av>
   <av attribute="number" value="plural"></av>
  </situation>
 </inflectionSituations>

<entry label="Entry0001" type="WO">
  <lemma>
   <text>
    <normal>vesel</normal>
    <phonetic>ve'sel</phonetic>
   </text>
```

FIG. 11-A

```
<semantics>
    <gloss>cu voie buna, bine dispus</gloss>
    <synonym entryLabel="Entry0020"></synonym>
    <antonym entryLabel="Entry0021"></antonym>
</semantics>
    <etymology language="sla">
    <text>
     <normal>веселъ</normal>
     <phonetic>veselu</phonetic>
    </text>
    <transliterate>veselu</transliterate>
    <gloss>cu voie buna, bine dispus</gloss>
    </etymology>
    <sy>
    <es> <esy>ve/sel</esy></es>
    <ps> <psy>ve/sel</psy></ps>
    </sy>
    <morphology situationLabel="AdjMascNomSg">
     <inflectionRule label="Flexiune_adj"></inflectionRule>
    </morphology>
    <supplement number="2">
     <text>
      <normal>veselă</normal>
      <phonetic>v'eselə</phonetic>
     </text>
     <sy>
      <es> <esy>v'e/se/lə</esy> </es>
      <ps> <psy>v'e/se/lə</psy> </ps>
     </sy>
     <morphology situationLabel="AdjFemNomSg"></morphology>
    </supplement>
    <supplement number="3">
     <text>
      <normal>veseli</normal>
      <phonetic>v'eselʲ</phonetic>
     </text>
     <sy>
      <es> <esy>v'e/selʲ</esy> </es>
      <ps> <psy>v'e/selʲ</psy> </ps>
     </sy>
     <morphology situationLabel="AdjMascNomPl"></morphology>
    </supplement>
```

FIG. 11-B

```
<supplement number="4">
 <text>
  <normal>vesele</normal>
<phonetic>v'esele</phonetic>
 </text>
 <sy>
  <es> <esy>v'e/se/le</esy> </es>
  <ps> <psy>v'e/se/le</psy> </ps>
 </sy>
 <morphology situationLabel="AdjFemNomPl"></morphology>
</supplement>
</lemma>

<markersString>
 <marker label="xxyyzz"></marker>
</markersString>
</entry>
</Lexicon>
```

FIG. 11-C

```xml
<?xml version="1.0" encoding = "unicode"?>
<!DOCTYPE Lexicon SYSTEM "Lexicon.dtd">
<Lexicon sourceLanguage = "RUM" exploitationLanguage = "RUM"
     sourceDirection = "right" exploitationDirection = "right">
 <entry label="Entry0010" type="AF">
  <analyticForm label="comparative, superiority">
   <attribute name="class"><value name="adjectiv"></value></attribute>
   <attribute name="comparative degree"><value name="comparative"></value>
   </attribute>
   <attribute name="type"><value name="superiority"></value></attribute>
   <attribute name="articulation"><value name="nonarticulate"></value>
   </attribute>
   <attribute name="gender"><value name="masculine"></value></attribute>
   <attribute name="number"><value name="singular"></value></attribute>
   <attribute name="case"><value name="nominative"></value></attribute>
   <centralCategory>
       <attribute name="class"><value name="adjective"></value>
       </attribute>
       <attribute name="comparison degree"><value name="positive"></value>
       </attribute>
       <attribute name="articulation"><value name="nonarticulate"></value>
       </attribute>
       <attribute name="gender"><value name="masculine"></value>
       </attribute>
       <attribute name="number"><value name="singular"></value>
       </attribute>
       <attribute name="case"><value name="nominative"></value>
       </attribute>
   </centralCategory>
   <wordAW entryLabel="Adv04" belongs="yes" relName="cuv_invar">
    <text>
     <normal>mai</normal>
     <phonetic>m_aj</phonetic>
    </text>
    <attribute name="class"> <value name="adverb"></value>
    </attribute>
    <attribute name="pronominal or not"><value name="nonpronominal">
         </value>
    </attribute>
    <attribute name="adverb type"><value name="noncircumstantial">
         </value>
    </attribute>
    <attribute name="noncircumstantial type"><value name="semiadverb">
         </value>
    </attribute>
   </wordAW> </analyticForm>
   <markersString>
      <marker label="aaa"></marker>
   </markersString>
 </entry>
</Lexicon>
```

FIG. 13

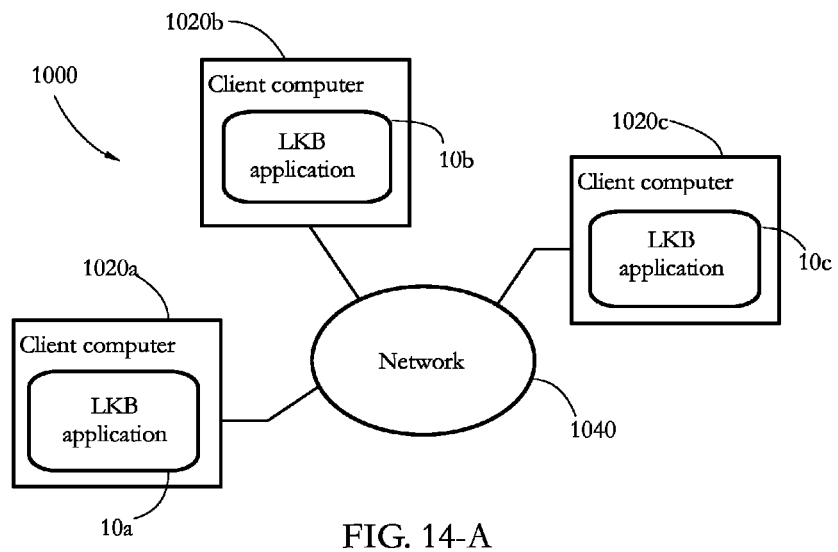
FIG. 14-A
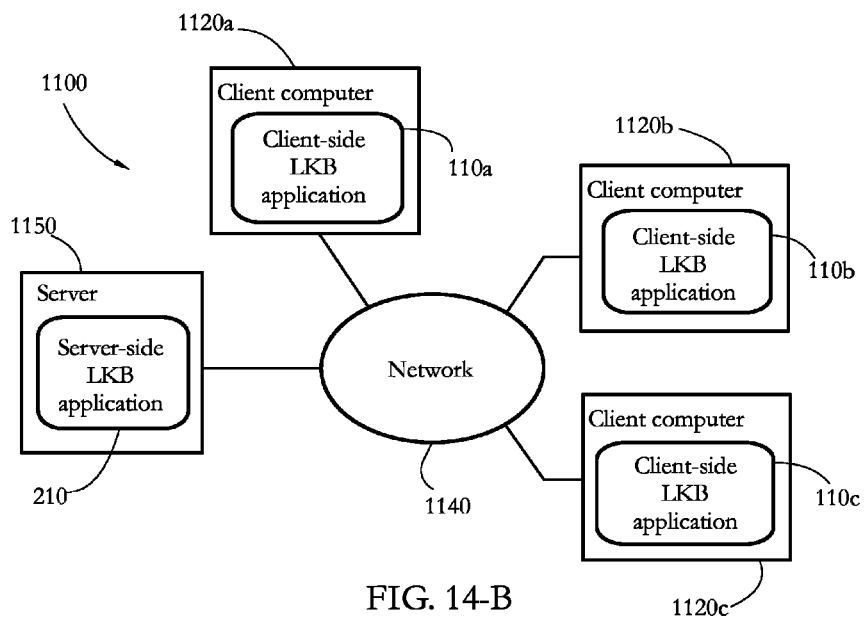
FIG. 14-B

SYSTEMS AND METHODS FOR MANAGING A COMPLEX LEXICON COMPRISING MULTIWORD EXPRESSIONS AND MULTIWORD INFLECTION TEMPLATES

BACKGROUND

The invention relates to methods and systems for computer processing of natural languages.

Commercial interest in computer-based human language processing has been steadily increasing in recent years. Globalization and the widespread use of the Internet are driving the development of automated translation technology, while progress in robotics and software engineering is fueling growth in the area of human-machine interfaces and automated document processing.

Language processing applications often use computer-readable linguistic knowledge bases (LKB) containing information on the lexicon, grammar, and linguistic structure of natural languages, as well as on linguistic correspondences and/or other relations between natural languages.

Tasks such as automated translation have long been considered difficult because of the diversity, inherent ambiguity, context-sensitivity, and redundancy of language, and also because of the implied (non-explicit) content of human communication. Multiword expressions (e.g. idiomatic phrases) represent a particular challenge. Phrases that express the same notion or message in different languages may not share equivalent words or syntactic structure. The meaning of some phrases, such as "to kick the bucket" or "to pass the buck", may be essentially different from that conveyed by their individual words.

Common approaches to natural language processing include dictionary-based, example-based, and corpus-based methods. Dictionary work involves the creation of lexical knowledge bases. Example-based methods aim to create large collections of example phrases, and to match incoming text to the stored examples. Corpus-based work often employs statistical models of relationships between words and other linguistic features.

SUMMARY

According to one aspect, a system comprises a computer-implemented lexicon manager, and a GAL compiler connected to the lexicon manager. The lexicon manager is configured to receive a multiword lexicon entry of a natural language. The multiword lexicon entry comprises a multiword expression and/or a multiword inflection template. The multiword lexicon entry comprises Grammar Abstract Language (GAL) code describing a dependency tree. The GAL compiler is configured to compile the GAL code into Extensible Markup Language (XML) code.

According to another aspect, a computer-implemented method comprises receiving a multiword lexicon entry of a natural language, the multiword lexicon entry comprising at least one of a multiword expression and a multiword inflection template, wherein the multiword lexicon entry comprises GAL code describing a dependency tree; and compiling the GAL code into XML code.

According to another aspect, a system comprises a computer-implemented lexicon manager configured to receive a multiword expression formulated in a natural language, perform a syntactic analysis of the multiword expression to produce a dependency tree of the multiword expression, and formulate a lexicon entry of the multiword expression GAL code, the lexicon entry comprising the dependency tree; and a GAL compiler connected to the lexicon manager and configured to compile the GAL code into XML code.

According to another aspect, a computer-implemented method comprises receiving a multiword expression formulated in a natural language; performing a syntactic analysis of the multiword expression to produce a dependency tree of the multiword expression; formulating a lexicon entry of the multiword expression in GAL code, the lexicon entry comprising the dependency tree; and compiling the GAL code into XML code.

According to another aspect, a system comprises a computer-implemented lexicon manager configured to receive an inflection rule of a natural language, determine an inflection template of the natural language according to the inflection rule, and formulate a lexicon entry of the inflection template in GAL code; and a GAL compiler connected to the lexicon manager and configured to compile the GAL code into XML code.

According to another aspect, a computer-implemented method comprises: receiving an inflection rule of a natural language; determining an inflection template of the natural language according to the inflection rule; formulating a lexicon entry of the inflection template in GAL code; and compiling the GAL code into XML code.

According to another aspect, a system comprises: means for receiving a multiword lexicon entry of a natural language, the multiword lexicon entry comprising at least one of a multiword expression and a multiword inflection template, wherein the multiword lexicon entry comprises GAL code describing a dependency tree; means for displaying to a user a graphical representation of the dependency tree in response to receiving the multiword lexicon entry; means for receiving a user input indicating a modification of the dependency tree in response to displaying the dependency tree; and means for compiling the GAL code into XML code.

BRIEF DESCRIPTION OF THE DRAWINGS

The foregoing aspects and advantages of the present invention will become better understood upon reading the following detailed description and upon reference to the drawings where:

FIG. 7-A shows an exemplary sequence of steps performed by the lexicon manager in the process of creating a lexicon entry comprising a word, morpheme, or procedure, according to some embodiments of the present invention.

FIG. 7-B shows an exemplary sequence of steps performed by the lexicon manager in the process of creating a lexicon entry comprising a morphological category, according to some embodiments of the present invention.

FIG. 7-C shows an exemplary sequence of steps performed by the lexicon manager in the process of creating a lexicon entry comprising a synthetic or analytic inflection template, according to some embodiments of the present invention.

FIG. 7-D shows an exemplary sequence of steps performed by the lexicon manager in the process of creating a lexicon entry comprising a multiword expression (MWE), according to some embodiments of the present invention.

FIG. 9-A shows a first segment of an exemplary XML encoding of the lexicon entry of FIG. 6, according to some embodiments of the present invention.

FIG. 9-B shows a second segment of an exemplary XML encoding of the lexicon entry of FIG. 6, according to some embodiments of the present invention.

FIG. 10-A illustrates a first segment of an exemplary GAL encoding of a word lemma lexicon entry according to some embodiments of the present invention.

FIG. 10-B shows a second segment of the exemplary GAL encoding of the word lemma lexicon entry shown in FIG. 10-A, according to some embodiments of the present invention.

FIG. 11-A illustrates a first segment of an exemplary XML encoding of the lexicon entry of FIGS. 10A-B, according to some embodiments of the present invention.

FIG. 11-B shows a second segment of an exemplary XML encoding of the lexicon entry of FIGS. 10A-B, according to some embodiments of the present invention.

FIG. 11-C illustrates a third segment of an exemplary XML encoding of the lexicon entry of FIGS. 10A-B, according to some embodiments of the present invention.

FIG. 13 illustrates an exemplary XML encoding of the lexicon entry of FIG. 10, according to some embodiments of the present invention.

FIG. 14-A shows an exemplary LKB management system including multiple client computers, each having a linguistic knowledge base application, according to some embodiments of the present invention.

FIG. 14-B shows and exemplary LKB creation system, including a server computer capable of interacting with multiple client computers, according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. A plurality of elements includes two or more elements. Any recitation of an element is understood to refer to at least one element. The statement that a first element comprises at least one of a second element and a third element is understood to mean that the first element comprises the second element alone, or the third element alone, or both the second and third elements. Any recitation of the modifier "or" is understood as "nonexclusive or". Unless otherwise required, any described method steps need not be necessarily performed in a particular illustrated order. A first element (e.g. data) derived from a second element encompasses a first element equal to the second element, as well as a first element generated by processing the second element and optionally other data. Unless otherwise specified, the term "program" encompasses both stand-alone programs and software routines that form part of larger programs. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer readable media encompass storage media such as magnetic, optic, and semiconductor media (e.g. hard drives, optical disks, flash memory, DRAM), as well as communications links such as conductive cables and fiber optic links.

The following description illustrates embodiments of the invention by way of example and not necessarily by way of limitation.

Figure 1:
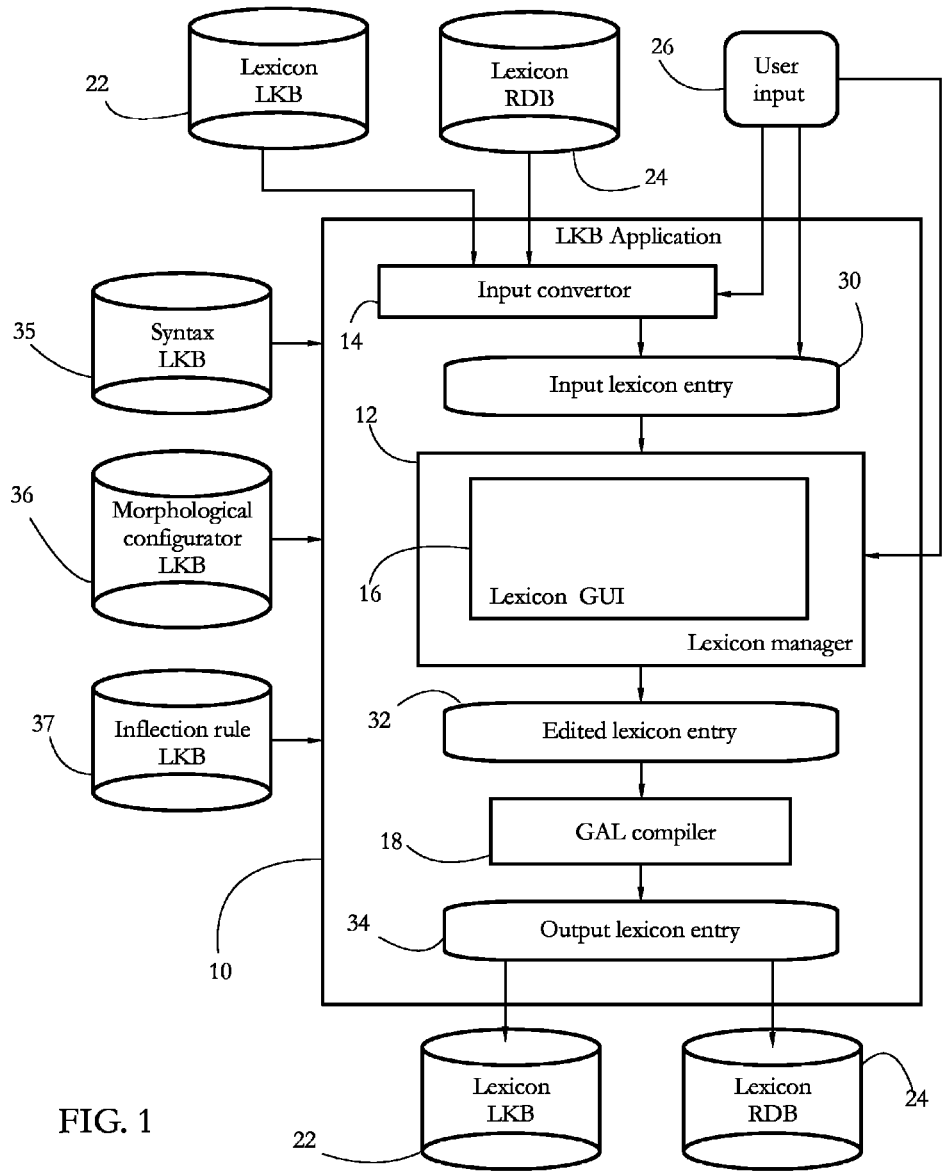
FIG. 1 shows an exemplary linguistic knowledge base (LKB) application (e.g. computer program) comprising a lexicon manager according to some embodiments of the present invention.

FIG. 1 shows a diagram of an exemplary linguistic knowledgebase (LKB) application 10 according to some embodiments of the present invention. Application 10 may be a computer program running on a system including one or more general-purpose computers. LKB application 10 maintains one or more LKBs comprising lexical data describing, among others, word lemmas, inflected forms, and multiword expressions in multiple natural languages, stored as computer-readable lexicon entries. Examples of natural languages include English, French, German, Japanese, and Romanian, among others. In some embodiments, LKB application 10 is configured to transform LKB data from one computer-readable format to another (e.g., from an extensible markup representation to a relational database representation and/or vice versa), to edit lexicon data, and/or to facilitate the insertion of new lexicon data provided by a human operator into LKBs of various data formats. LKB application 10 includes an input converter 14, a lexicon manager 12 connected to input converter 14, and a grammar abstract language (GAL) compiler 18 connected to lexicon manager 12. LKB application 10 receives input from storage or from a human operator, as well as data from a set of morpho-syntactic LKBs, and produces output destined for storage, further processing, and/or display to a user.

Morpho-syntactic LKBs include a syntax LKB 35, a morphological configurator LKB 36, and an inflection rule LKB 37. In some embodiments, syntax LKB 35 comprises an inventory of syntax rules describing of the syntax of the respective language.

Figure 2:
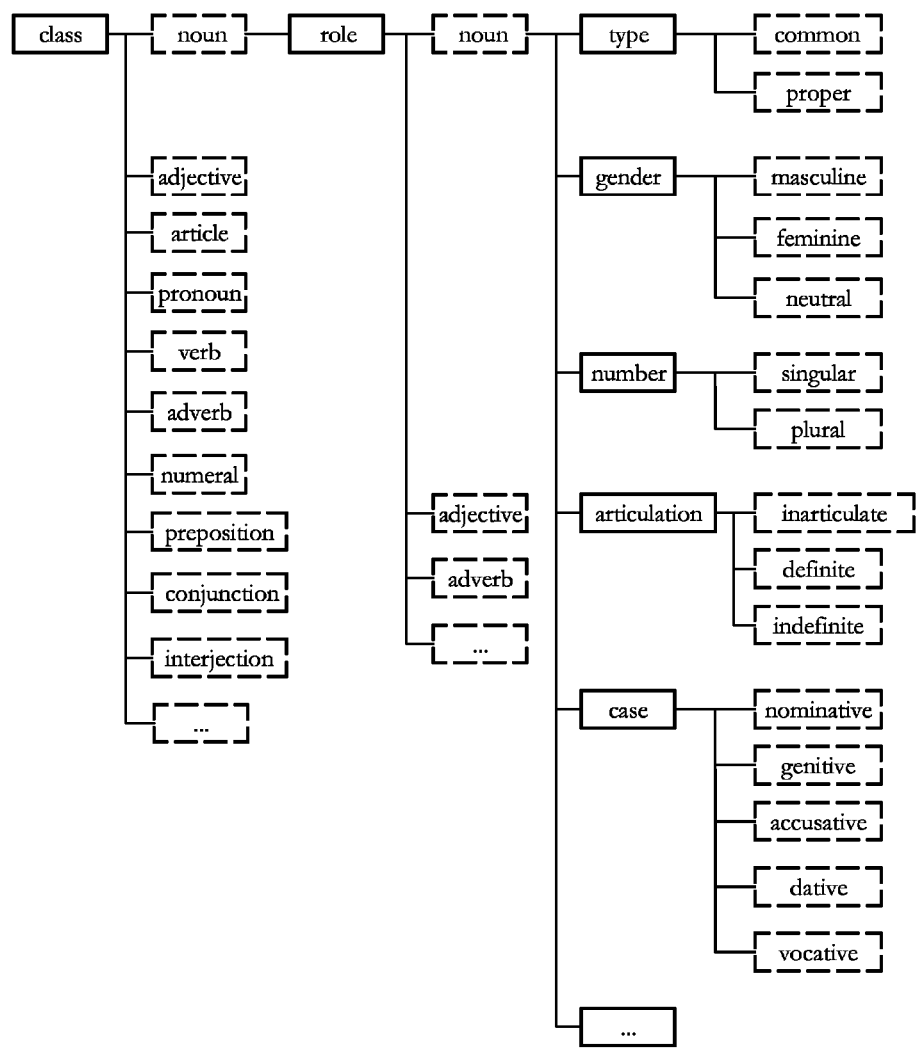
FIG. 2 shows an exemplary morphological tree of the Romanian language according to some embodiments of the present invention.

In some embodiments, morphological configurator LKB 36 includes an inventory of morphological attribute/value pairs of the respective language, stored as an attribute-value tree (AVT, see below) known as a morphological tree. FIG. 2 illustrates such a morphological tree of the Romanian language showing that, for example, nouns have distinct inflection situations according to gender, number, case, articulation, etc.

Each inflection situation of a natural language comprises a unique set of morphological attribute/value pairs of the respective language. Exemplary inflection situations are {class:noun/role:noun/case:accusative/gender:feminine/ number:singular} and {class:verb/transitivity:transitive/tense:present/mood:indicative/person:first/number:singular}). The AVT representation of the morphological tree allows for a compact representation of the set of inflection situations of the respective language. In principle, each inflection situation may be determined according to a set of morphological paths or subtrees of the morphological tree. In some embodiments, a morphological path comprises a contiguously connected set of nodes spanning the morphological tree from the trunk to a single end-branch. Exemplary morphological paths of the tree pictured in FIG. 2 are {class:noun/role:noun/case:genitive} and {class:noun/role:noun/number:plural}. In some embodiments, inflection situations of a target word may be constructed according to a mathematical operation (e.g. union) applied to a set of morphological paths corresponding to the target word. For example, the union of the exemplary pair of paths above may yield the inflection situation {class:noun/role:noun/case:genitive/number:plural}.

Figure 3:
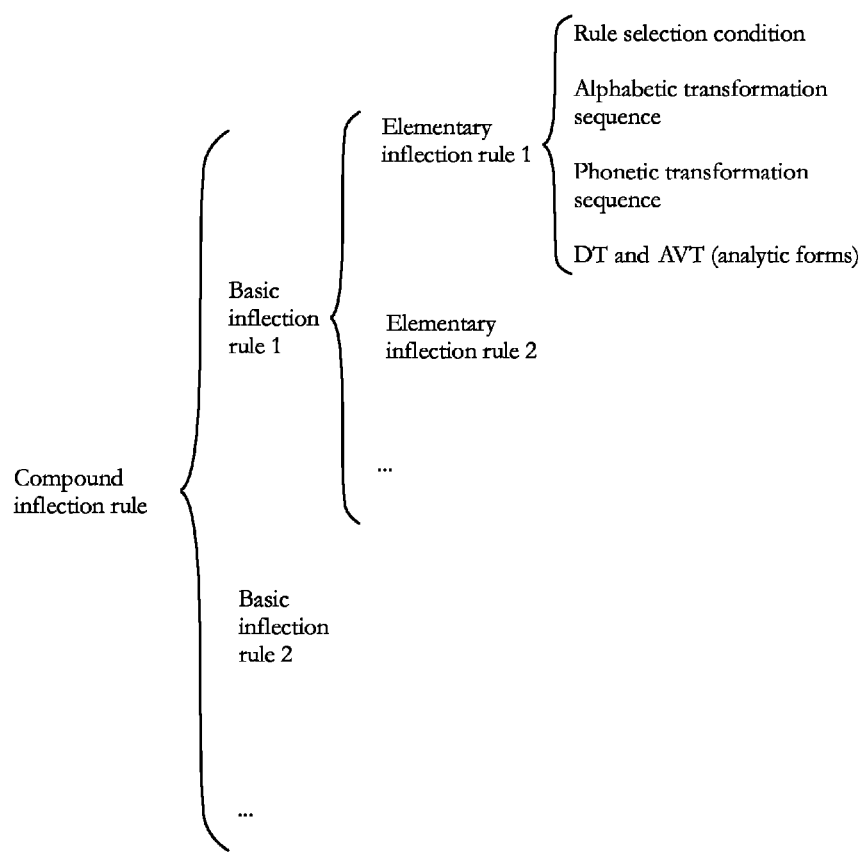
FIG. 3 shows an exemplary structure of an inflection rule according to some embodiments of the present invention.

In some embodiments, inflection rule LKB 37 (FIG. 1) comprises an inventory of inflection rules, each rule corresponding to at least one inflection situation of the respective language. FIG. 3 shows a generic structure of an exemplary inflection rule according to some embodiments of the present invention. In some embodiments, each rule may be a hierarchical data structure including compound inflection rules, basic inflection rules, and elementary inflection rules. A compound inflection rule may include a set of basic inflection rules, each of which in its turn may include a set of elementary inflection rules or variants. As an example, a compound inflection rule may apply to all feminine nouns. This compound inflection rule may have two basic inflection rules, corresponding to e.g. animate and inanimate feminine nouns, respectively, in case the respective inflected forms are distinct. The basic rule for inanimate feminine nouns may itself include a set of elementary inflection rules or variants, each corresponding to an inanimate feminine noun with a distinct termination. For example, in English, common nouns ending in "-f" receive a "-ves" ending for plural (loaf-loaves, wolf-wolves), as opposed to most other nouns, which receive an "-s" ending (car-cars, table-tables).

In some embodiments, each elementary inflection rule stored in LKB 37 may include a condition indicator defining the range of applicability of the respective rule, an indicator showing an association to at least one inflection situation (e.g. {class:noun/gender:feminine/case:accusative/number:plural/articulation:indefinite}), and a computer-readable encoding of an algorithm that allows the generation of a respective inflected form starting from a reference word form such as a word lemma or a specific inflected form of a word. Such algorithms (also termed transformation sequences) include addition, replacement, and removal of characters or words to/from the reference word form, among others. Some embodiments store transformation sequences for both normal and phonetic representations. An exemplary condition indicator includes an expression evaluating to a logical value (yes/no), having as operands lemmas (e.g. "goose"), AVTs (e.g., {class:noun/gender:feminine}) normal or phonetic character strings (e.g., "nouns ending in -f"), etc. In some embodiments, inflection rules which generate analytic (multiword) inflected forms may also include computer-readable encodings of dependency trees (DT, see below) corresponding to the respective inflected forms.

Some embodiments of morpho-syntactic LKBs 35-37 may store linguistic data in a computer-readable form such as XML, in which case a document type definition (DTD) is provided for every data type. In some embodiments, morpho-syntactic LKBs 35-37 may reside on a server computer or on computer readable media, in part or entirely, and may be made available to application 10 over a computer network, as shown below.

In some embodiments, input converter 14 (FIG. 1) receives input comprising computer-readable lexical data from a lexicon LKB 22 and/or a lexicon relational database (RDB) 24, formulates an input lexicon entry 30, and forwards entry 30 to lexicon manager 12. In some embodiments, lexicon LKB 22 stores data in a non-relational descriptive format such as extensible markup language (XML), whereas lexicon RDB 24 may store data in a relational database format. In some embodiments, a document type definition (DTD) may accompany databases 22 and/or 24. In some embodiments, lexicon LKB 22 and/or lexicon RDB 24 may be stored on a server computer or on computer readable media, in part or entirely, and may be made available to application 10 over a computer network, as shown below. To produce input lexicon entry 30, some embodiments of input converter 14 may compile lexicon data from XML or RDB format into a grammar abstract language (GAL) format (see below).

In some embodiments, input converter 14 may receive a user input comprising lexicon entry 30 from an operator. The lexicon entry provided in user input 26 may include text parts, grammar abstract language (GAL) declarations, and/or calls to a set of GAL macros (linguistic processing routines of higher level than GAL, wherein each GAL macro may comprise a plurality of GAL declarations). In some embodiments, a subsystem of LKB application 10 may be configured to assist the user in formulating and/or properly formatting lexicon data, e.g. by means of a graphical interface and/or electronic form comprising data input fields. In some embodiments, input converter 14 may include a GAL macro interpreter configured to compile any GAL macro calls included in user input 26 into GAL language format.

In some embodiments, lexicon manager 12 receives input lexicon entry 30 from input converter 14 and outputs an edited lexicon entry 32 to GAL compiler 18. Lexicon manager 12 may comprise a lexicon graphical user interface (GUI) 16 configured to receive a computer-readable encoding of a linguistic dependency tree and/or attribute-value tree, to display a graphical representation of the dependency tree and/or attribute-value tree to a user, and to receive a modification of the dependency tree and/or attribute-value tree by the user, as described in detail below.

In some embodiments, GAL compiler 18 receives edited lexicon entry 32 and produces an output lexicon entry 34 comprising a compilation of entry 32 into a computer-readable data format such as XML or RDB. In some embodiments, GAL compiler 18 may include a database socket, configured to transmit output lexicon entry 34 to lexicon LKB 22 or lexicon RDB 24.

Figure 4:
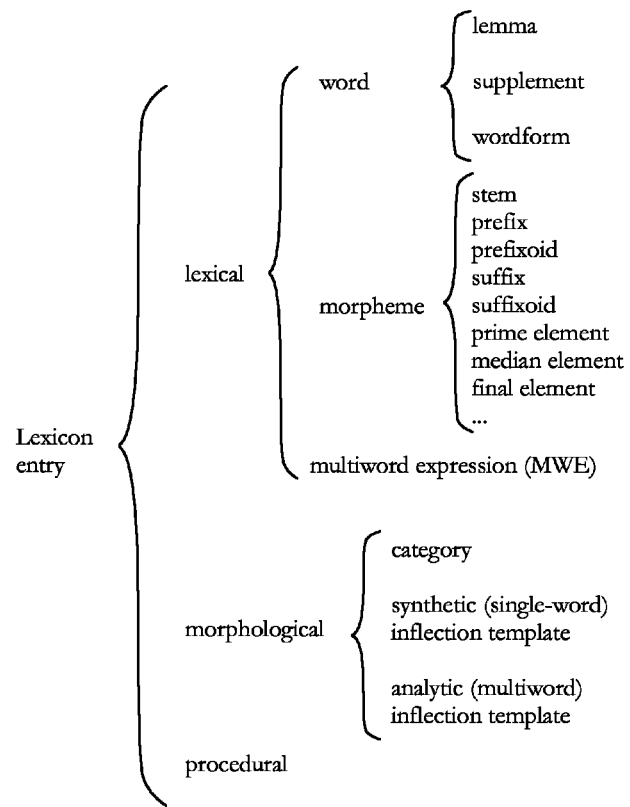
FIG. 4 shows an exemplary classification of lexicon entry types according to some embodiments of the present invention.

In some embodiments, lexicon RDB 24 and/or lexicon LKB 22 comprise an inventory of computer-readable lexicon entries. FIG. 4 shows an exemplary set of lexicon entry types according to some embodiments of the present invention. Entry types may include lexical entries (word, morpheme, and multiword expressions), morphological entries (morphological categories, synthetic and analytic inflection templates), as well as procedural entries, among others.

Word-type entries comprise lexical information corresponding to individual words of a natural language. In some embodiments, a word-type entry may comprise a lemma and a set of supplements and/or additional word forms. In some embodiments, the lemma is the canonical, dictionary form of the word. For example, for nouns, the lemma may be the nominative singular form of the word, while for verbs it may be the infinitive form. The morphological form of the lemma may be chosen by convention, and may vary between languages. In some embodiments, the lemma of a single word entry may comprise multiple words. For example, in English, the infinitive of verbs is accompanied by the particle "to", e.g. to fly, to read. Therefore, the lemma of the single word entry "read" may be "to read". One of the words of a multiple word lemma may be chosen as center word ("read" in the previous example), and the others may be regarded as auxiliary ("to", in the same example). In some embodiments, a supplement is a word that accompanies the lemma and does not receive a separate lexicon entry. For example, in many dictionaries, the lemma of a noun (nominative-singular form) may be accompanied by a supplement nominative-plural form of the noun. The lemma of an adjective is usually chosen to be the nominative-masculine-singular form, in which case it may be accompanied by the supplements nominative-masculine-plural, nominative-feminine-singular, and nominative-feminine-plural forms of the same adjective.

In some embodiments, morpheme entries may include stems, prefixes, suffixes, prefixoids, suffixoids, prime elements, median elements, and final elements, among others. In some embodiments, the stem may be defined as the base part or section of a word not including inflectional morphemes which is common to many (sometimes all) inflected forms of the respective word. For example, the Spanish "gat" is the stem for gato (male cat), gata (female cat), gatos (cats), etc. Prefixes and suffixes are sequences of characters that are attached to the beginning and end of a stem, respectively, to generate inflected forms. In some embodiments, prefixoids are pseudo-prefixes, such as "ante-", "infra-", "inter-". Suffixoids are pseudo-suffixes: "-fuge" as in centrifuge, "-phobe" as in xenophobe, "-phile" as in pedophile, etc. Prime elements are particles placed at the beginning of words, while not considered as prefixes. Median elements are sequences of characters forming the middle part of certain families of words (e.g. "bio" as in probiotic). Final elements are character sequences placed at the end of certain classes of words, without being considered suffixes (e.g. "andry" as in polyandry).

Multiword lexicon entries comprise lexical data corresponding to multiword expressions (MWEs) and multiword (analytic) inflection templates (see below). A multiword expression may be any meaningful sequence of words in a natural language, whose multiword quality does not stem from inflection alone. The sequence of words forming an MWE is used as a whole, the meaning of which may be distinct from that of its constituent words and/or from the literal meaning of the MWE. Examples of MWEs include composite words (e.g. high-risk, to finger-point, member of parliament, chief executive officer, expectation value), phrasal constructions such as propositional verbs (e.g. to put off, to stumble upon, to look after), and idiomatic phrases (e.g. turn of phrase, to hit the nail on the head, to pass the buck, to kick the bucket), among others. By contrast, multiword entities resulting from inflection (e.g., more refined, should have gone, etc.), or multiword lemmas (e.g. to read) are not considered MWEs.

In some embodiments, morphological lexicon entries may comprise morphological categories, and synthetic and analytic inflection templates, among others. In some embodiments, morphological category lexicon entries comprise attribute-value trees (AVT, see below) of morphological attributes and their associated values. An exemplary morphological category lexicon entry comprises a selected morphological path consistent with morphological configurator LKB 36 (see FIG. 2), such as {class:noun/role:noun/gender:masculine/}.

In many natural languages, the inflected form of a word may comprise either a single word (also termed a synthetic inflected form), or multiple words (also called an analytic inflected form). For example, in English, the common plural form of nouns is a synthetic form (the noun receives an -s suffix, while remaining a single word: cars, images, etc.). The comparative form of an adjective may be either a synthetic form (single-word, e.g. faster), or an analytic form (multi-word, e.g. more beautiful). In some embodiments, an inflection template is a symbolic representation of a class of words, wherein each word is an inflected form, and wherein all words share a common inflection situation. Inflection templates may be single-word (synthetic) or multiword (analytic) templates, depending on whether the corresponding inflected forms are synthetic or analytic, respectively. An exemplary synthetic inflection template corresponding to the example above is "noun-s", which may represent all plural nouns of the English language, constructed via an -s suffix (such as: cars, trees, males, etc., but not: phenomena, people, fungi, etc.). An exemplary analytic inflection template is "more adjective", which may represent all adjectives in the comparative form, constructed by placing the particle "more" in front of the word (e.g. more beautiful, more concise, etc., but not faster, cheaper, etc.).

In some embodiments, a lexicon entry corresponding to a synthetic inflection template comprises a computer-readable encoding of an association between a pseudoterminal linguistic node (e.g. "noun-s" in the example above) and an attribute-value tree describing the respective inflection situation (e.g. class:adjective/comparative degree:comparative/type:superiority etc.). A lexicon entry corresponding to an analytic inflection template comprises a computer-readable encoding of an association between a pseudoterminal node (e.g. "adjective" in the example above), an attribute-value tree describing the respective inflection situation, and a dependency tree describing the relationships between individual words making up the respective inflection template (e.g. the grammatical relationship between "more" and "adjective", in the example above). A discussion of linguistic dependency trees, nodes, and attribute-value trees, including definitions and examples, is given below. An explicit example of a lexicon entry comprising an analytic inflection template follows.

In some embodiments, procedural lexicon entries may comprise operational entities (such as algorithms and/or computer programs), which allow various manipulations of other lexicon entries. For example, a procedural entry may transform a number (e.g. 21) into its text representation (twenty-one) and/or vice versa. Other examples of procedural entries comprise image and/or sound processing routines.

In some embodiments, a lexicon entry may comprise a text representation of the entry in the respective language, and a set of additional data related to the entry. Examples of such data include: phonetic transcriptions, indicators of semantics (e.g. the meaning of the entry in various contexts, a set of synonyms, antonyms, paronyms, hyponyms, hypernyms, meronyms, holonyms, homonyms, heteronyms, homophones, diminutives, augmentatives, etc., of the respective entry), indicators of etymology (which may include text representations in the language of origin), indicators of time or period (e.g., for archaic word forms), and indicators of specific areas of use (e.g. seamanship, biotechnology, slang, etc.), among others.

Figure 5:
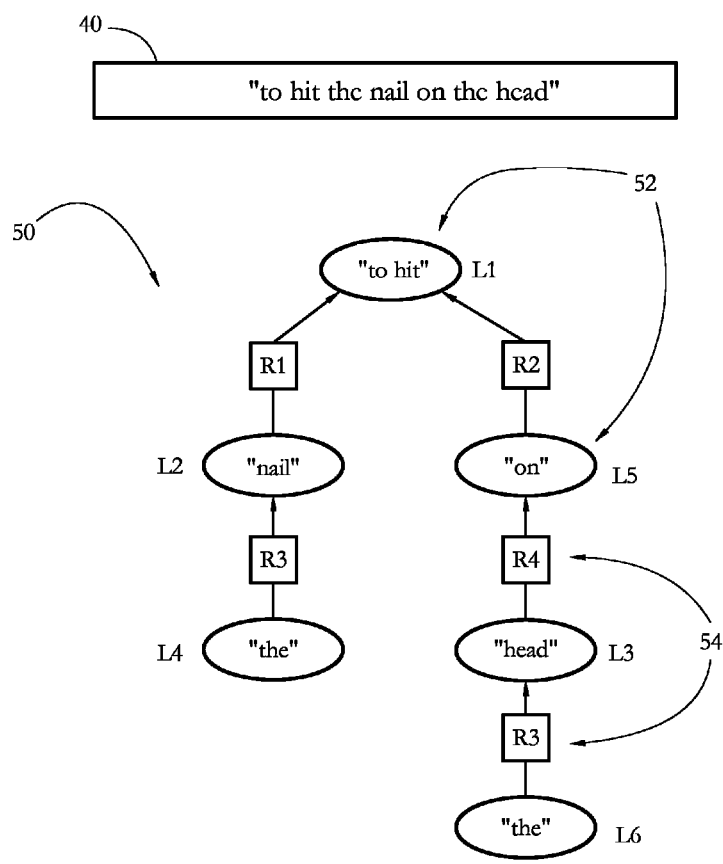
FIG. 5 shows an exemplary dependency tree (DT) representation of a multiword expression (MWE), according to some embodiments of the present invention.

In some embodiments, multiword lexicon entries such as MWEs and/or analytic inflection templates may comprise dependency trees (DTs). FIG. 5 shows an exemplary graphical representation of a dependency tree 50 associated with a natural language MWE 40. Dependency tree 50 is a hierarchical, branched structure comprising a plurality of linguistic nodes 52 connected by linguistic links 54.

The nodes shown in FIG. 5 are terminal nodes, each representing an individual word. In some embodiments, dependency trees may include terminal nodes, non-terminal nodes, pseudoterminal nodes and/or procedural nodes. Terminal nodes are nodes that can not be further substituted with other nodes or dependency trees. An example of a terminal node is a word. In some embodiments, terminal nodes may be invariable, wholly-variable, or partially-variable. Invariable terminal nodes have a fixed form in different instances of a multiword expression. Wholly-variable terminal nodes can appear as different words in different instances of the same multiword expression. Partially-variable terminal nodes can appear with different inflexions in different instances of a multiword expression. A non-terminal node can be substituted with other nodes or dependency trees. Pseudoterminal nodes may represent categories of words (e.g. nouns) sharing a given grammatical function.

Procedural nodes are computer routines executed in relation to the respective node. An illustrative procedural node is a piece of code that turns numerals (e.g. "twenty-one") into their numeric values (e.g. 21). Other procedural nodes may, for example, manipulate pictures or sounds embedded in a piece of text.

In general, a linguistic node such as the nodes 52 shown in FIG. 5 may represent a part (e.g. a word or sub-expression) of a multiword expression, while a linguistic link such as the linguistic links 54 shown in FIG. 5 may represent a grammatical relationship between a pair of linguistic nodes. The type of grammatical relationship represented by links 54 may depend on the respective natural language. In some embodiments, general types of grammatical relationships may comprise coordination and subordination. Some links 54 may represent more particular types of grammatical relationship. For example, in FIG. 5, the linguistic link labeled R1 may represent the relation between a verb and its direct object, while R3 may represent the relation between a noun and the definite article. In some embodiments, linguistic links and/or grammatical relationships may be described at lower levels of abstraction.

Figure 6:
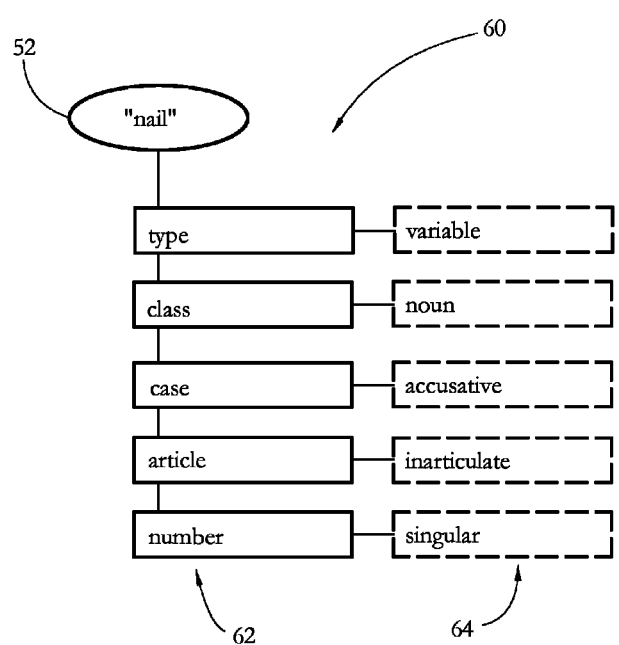
FIG. 6 shows an exemplary attribute-value tree (AVT) associated to a node of the dependency tree of FIG. 5, according to some embodiments of the present invention.

In some embodiments, each linguistic node 52 of dependency tree 50 may comprise an attribute-value tree (AVT). FIG. 6 shows an illustrative attribute-value tree 60 associated with the node representing the word "nail" in FIG. 5. AVT 60 includes a set of attribute nodes 62 each having one or more value (instance) nodes 64 as children. Attribute nodes 62 may represent various linguistic features, which describe a given node 62 from the viewpoint of grammar. For example, each attribute node 62 may represent a syntactic or morphological category (such as case, number, gender). Value nodes 64 represent actual instances or values of an attribute node 62 corresponding to a given linguistic node. In some embodiments, value nodes 64 themselves may have one or more attribute nodes as children.

In some embodiments, LKB data may be organized according to a Generative Dependency Grammar (GDG). For further information on GDG see for example the article by S. Diaconescu, *"Natural Language Syntax Description using Generative Dependency Grammar"*, POLIBITS, Number 38, July-December 2008, ISSN:1870-9044. A GDG provides a set of rules for generating a dependency tree (DT). In exemplary embodiments, each rule relates a left side (member) to a right side (member), wherein the left side of each rule contains a non-terminal DT node, and the right side of each rule has two parts: a node sequence, and a DT describing the interrelations of the nodes of the sequence. A terminal DT node, for example a word in a language, is present in that language's lexicon and may appear in the right side of one or more GDG rules. A non-terminal DT node appears at least once in the left side of a GDG rule and may appear in the right side of one or more GDG rules. A rule having a non-terminal node on its left side describes that node, while a rule having a non-terminal node on its right side refers to that node. A pseudoterminal node may appear on the right side of one or more GDG rules, but does not appear on the left side of a GDG rule. A generative process based on a GDG may be applied to some new text to confirm that the text is grammatically correct (accepted by the GDG) and to generate a DT for the new text.

In some embodiments, a description of any dependency tree and associated attribute-value trees may be expressed in a formal language denoted below as a Grammar Abstract Language (GAL). A GAL is a high-level language dedicated to linguistic processing, which provides an interface allowing human users to transfer linguistic knowledge to a computing environment in various levels of detail. In particular, GAL is a descriptive markup language comprising formal declarations for linguistic dependency tree and attribute-value tree data consistent with a GDG. For an individual natural language, a GAL may describe the language's alphabet, syllabification, lexicon, morphology, syntax, inflection rules and forms, among others. For a pair of natural languages, a GAL may include lexical, morphological, and syntactic correspondence sections describing lexical correspondences between the two languages. In exemplary embodiments, linguistic systems and methods described herein may employ a grammar abstract language as described in the article by S. Diaconescu, "GRAALAN—Grammar Abstract Language Basics", *GESTS International Transactions on Computer Science and Engineering*, Vol. 10, No. 1 (2005).

In some embodiments, linguistic data including dependency tree data and attribute-value tree data may be formulated and stored in a low-level formal language not specific to linguistic processing, such as an extensible markup language (XML) as exemplified below. For XML linguistic data, document type definitions (DTD) may be provided for each data type.

FIGS. 7-A-D show exemplary sequences of steps performed by lexicon manager 12 (FIG. 1) according to some embodiments of the present invention. Lexicon manager 12 may be configured to verify/modify an existing lexicon entry and/or to create new lexicon entries according to the input provided by a human operator. Manager 12 may also be configured to interact with input converter 14 and GAL compiler 18 in such a way as to convert an existing lexicon entry from one data format to another (e.g. RDB to XML, or XML to GAL). Depending on the desired mode of operation, lexicon manager 12 may receive input lexicon entry 30 (via input converter 14) from lexicon LKB 22, lexicon RDB 24, or user input 26, and may forward edited lexicon entry 32 corresponding to entry 30 to GAL compiler 18. In some embodiments, user input 26 may include a processing request indicating the type of operation to be performed by manager 12 (e.g. create entry, convert entry, edit entry, visualize entry, etc.). The processing request may include an indicator of the type of lexicon entry to be processed (e.g., word, multiword expression, etc.) and/or an indicator of the desired data format of output lexicon entry 34 (XML, RDB, etc.). The sequence of steps performed by lexicon manager may be lexicon type-specific, as described below.

FIG. 7-A shows an exemplary sequence of steps followed by lexicon manager 12 for a lexicon entry of type word, morpheme, or procedure. In a step 70, manager 12 receives input lexicon entry 30. Entry 30 may comprise instances of a predetermined set of data fields, including a text representation of entry 30, an encoding of the dependency tree associated to entry 30 (for multiword entries), and a set of corresponding AVT values. Examples of lexicon entries formulated in GAL are given further below. Step 70 may comprise requesting specific lexicon data (e.g. AVT values) from a user, from lexicon LKB 22 and/or lexicon RDB 24. For example, when input lexicon entry 30 contains incomplete information (e.g., not all values required in the formulation of an AVT were supplied in entry 30), manager 12 may request that the user provide the missing data, or that the missing data be retrieved from an appropriate linguistic knowledgebase. Requesting data from a human operator may comprise employing a subsystem of linguistic LKB 10 to display a graphical representation of the request to the operator (e.g. to display a set of input fields on a display device), and to receive a response from the operator (e.g. to receive the contents of said input fields as filled in by the operator at an input device such as a computer keyboard). Requesting data from linguistic knowledgebases 22, 24 may comprise formulating a data query, transmitting the query to the respective knowledgebase, receiving, and interpreting the result of the query. The number and type of input fields displayed to the user and/or of query fields composing the request from knowledgebases 22, 24 may depend on the type of lexicon entry being processed.

In a step 72a, lexicon manager 12 may formulate edited lexicon entry 32 according to input lexicon entry 30. Step 72a may comprise expressing edited lexicon entry 32 in GAL (e.g. performing a conversion from the data format of entry 30 into GAL), and/or transmitting entry 32 to GAL compiler 18.

FIG. 7-B shows an exemplary sequence of steps followed by lexicon manager 12 for a lexicon entry of the morphological category type. In a step 66, lexicon manager 12 determines (e.g. from the processing request) whether the lexicon entry is created manually or automatically. When the lexicon entry is created manually, lexicon manager proceeds to step 70 described above. When automatic lexicon entry creation is desired, in a step 74 lexicon manager 12 retrieves lexicon data corresponding to the respective morphological category (e.g. AVT data describing the respective class of word and inflection situation) from morphological configurator LKB 36. Retrieving data from LKB 36 may comprise formulating a data query, transmitting the query to the respective knowledgebase, receiving, and interpreting the result of the query. Next, in a step 72b lexicon manager 12 may formulate edited lexicon entry 32 according to input lexicon entry 30 and/or data retrieved from LKB 36. Step 72b may comprise translating entry 32 into GAL, and/or transmitting entry 32 to GAL compiler 18.

FIG. 7-C shows an exemplary sequence of steps followed by lexicon manager 12 for a lexicon entry of the synthetic or analytic inflection template type, according to some embodiments of the present invention. In step 70 (see above), manager 12 receives input lexicon entry 30. Step 66 (see above) determines whether lexicon entry creation is manual or automatic. When the processing request indicates a manual entry creation, manager 12 proceeds to a step 80. For automatic entry creation, in a step 76 manager 12 performs a lookup of an inflection rule corresponding to the respective inflection template in inflection rule LKB 37, and determines the inflection template according to the inflection rule (e.g. according to a transformation sequence encoded in the inflection rule, see FIG. 3). In some embodiments, data acquired by manager 12 upon execution of step 76 may replace specific data fields of entry 30 and/or may be appended to entry 30.

In step 80, lexicon manager 12 may invoke lexicon creation GUI 16 (FIG. 1) to display to a user a graphical representation of the dependency tree associated to input lexicon entry 30. In some embodiments, GUI 16 may also display the text representation of entry 30 and/or a set of attribute-value trees corresponding to a set of nodes of the dependency tree. In some embodiments, the display of attribute-value tree data may proceed interactively (e.g. the AVT information may be displayed when the user clicks or otherwise selects a node of the DT). In some embodiments, GUI 16 may display DT data only when explicitly requested by the user.

Next, in a step 82, lexicon manager 12 may receive a user input indicating a modification of the DT and/or AVT(s) associated to input entry 30. Exemplary modifications to a dependency tree are corrections to the DT including node deletion/creation, link deletion/creation, editing the type of node/link, and node annotation (adding textual information to the respective node), among others. Modifications to an attribute value tree may include replacing a value of a particular attribute node, and providing a value to a particular attribute node (e.g. missing data), among others. In some embodiments, modifications to DT(s) and/or AVT(s) are implemented interactively via a set of graphical operations, including selecting a node by e.g. clicking an icon, displaying input fields and receiving the user-supplied content of such fields, creating and/or deleting a node by drag-and-drop operations, and modifying a linguistic link by dragging its ends, among others.

In a step 72c, lexicon manager 12 may formulate edited lexicon entry 32 according to input lexicon entry 30 and any modifications indicated by the user in step 82. To produce output entry 32, information provided by the user may replace and/or be appended to input lexicon entry 30 (e.g. new, user-indicated, or automatically determined values may replace original ones in certain fields of AVTs). In some embodiments, if step 82 does not comprise any corrections, edited entry 32 may be identical to input entry 30. In some embodiments, Step 72c may comprise translating entry 32 into GAL, and/or transmitting entry 32 to GAL compiler 18.

FIG. 7-D shows an exemplary sequence of steps followed by lexicon manager 12 for a MWE lexicon entry, according to some embodiments of the present invention. In step 70 (see above), manager 12 receives input lexicon entry 30. In a step 68, manager 12 determines whether entry 30 includes a representation of a dependency tree associated to the MWE. If yes, manager 12 proceeds to step 80. If no, in a step 78 manager 12 performs a syntactic analysis of the respective MWE. In some embodiments, the syntactic analysis receives a text representation of the MWE and produces a dependency tree of the MWE according to a selected syntax rule defined in syntax LKB 35. In some embodiments, the syntactic analysis comprises performing a lookup of the selected syntax rule in syntax LKB 35, by e.g. formulating a data query, transmitting the query to the respective knowledgebase, receiving, and interpreting the result of the query.

Steps 80 and 82 comprise displaying the DT(s) and/or AVT(s) of the MWE, and receiving a modification to the tree(s) from the user (see above). Next, in a step 72d, lexicon manager 12 may formulate edited lexicon entry 32 of the MWE according to input lexicon entry 30 and any modifications indicated by the user in step 82. To produce output entry 32, information provided by the user may replace and/or be appended to input lexicon entry 30 (e.g. new, user-indicated, or automatically determined values may replace original ones in certain fields of AVTs). In some embodiments, if step 82 does not comprise any corrections, edited entry 32 may be identical to input entry 30. In some embodiments, Step 72*d* may comprise converting entry 32 into GAL format, and/or transmitting entry 32 to GAL compiler 18.

Figure 8:
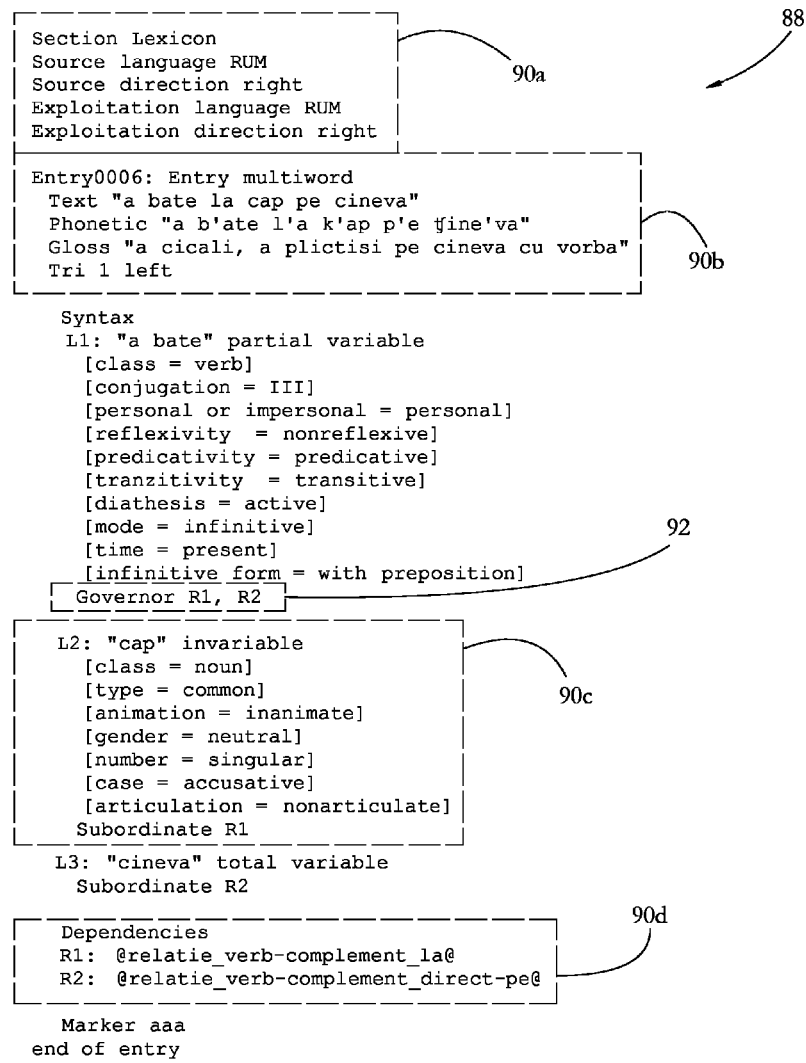
FIG. 8 illustrates a grammar abstract language (GAL) encoding of a lexicon entry corresponding to a multiword expression in the Romanian language, according to some embodiments of the present invention.

FIG. 8 shows an exemplary multiword lexicon entry 88 formulated in GAL, and corresponding to the Romanian expression "a bate pe cineva la cap" (to pester or annoy someone). Entry 88 comprises a header 90*a* including indicators of the respective GAL section ("lexicon"), and language ("RUM" for Romanian), among others. Entry 88 may also comprise a set of indicators 90*b* of linguistic data associated to the entry, such as a text representation of the entry in the Romanian language, a phonetic transcription, and an indicator of the common meaning of the expression (gloss). Next, for each node of the dependency tree associated to the multiword entry, entry 88 may include a node AVT declaration 90*c* describing various properties of the respective node, such as the grammatical category and/or inflection situation. In some embodiments, for each node of the dependency tree, entry 88 may include a node context declaration 92 indicating the quality of the respective node in relation to other nodes of the dependency tree to which it is connected (e.g. subordination, coordination). Together, the set of node context declarations 92 provide a representation of the hierarchical structure of the dependency tree associated to the multiword entry. The exemplary GAL code concludes with a set of relationship declarations 90*d* describing the type of relationships between each pair of nodes of the dependency tree. FIGS. 9A-B illustrate an exemplary XML encoding of the lexicon entry in FIG. 8 according to some embodiments of the present invention.

FIG. 10 shows an exemplary single-word lexicon entry 94 formulated in GAL, and corresponding to the word "vesel", a Romanian adjective meaning happy, content. Besides a header 96*a*, entry 94 comprises a set of inflection indicators 96*b* in the form of AVTs describing the inflection situations corresponding to either the lemma (in this case, singular-masculine-nominative) or a supplement of the lemma (in this case, a plural-masculine-nominative, a singular-feminine-nominative, and a plural-feminine nominative inflection of the adjective, respectively). Entry 94 may continue with a lemma AVT declaration 96*c* comprising, among others, a text representation of the lemma in the Romanian language, a phonetic transcription, an indicator of etymology, and indicators for various types of syllabification. Next, for each supplement, entry 94 may include a supplement AVT declaration 96*d* comprising a text representation of the respective supplement, and additional indicators such as syllabification patterns and a pointer to the respective inflection situation defined by indicators 96*b*. FIGS. 11A-C illustrate an exemplary XML encoding of the lexicon entry in FIG. 10 according to some embodiments of the present invention.

Figure 12:
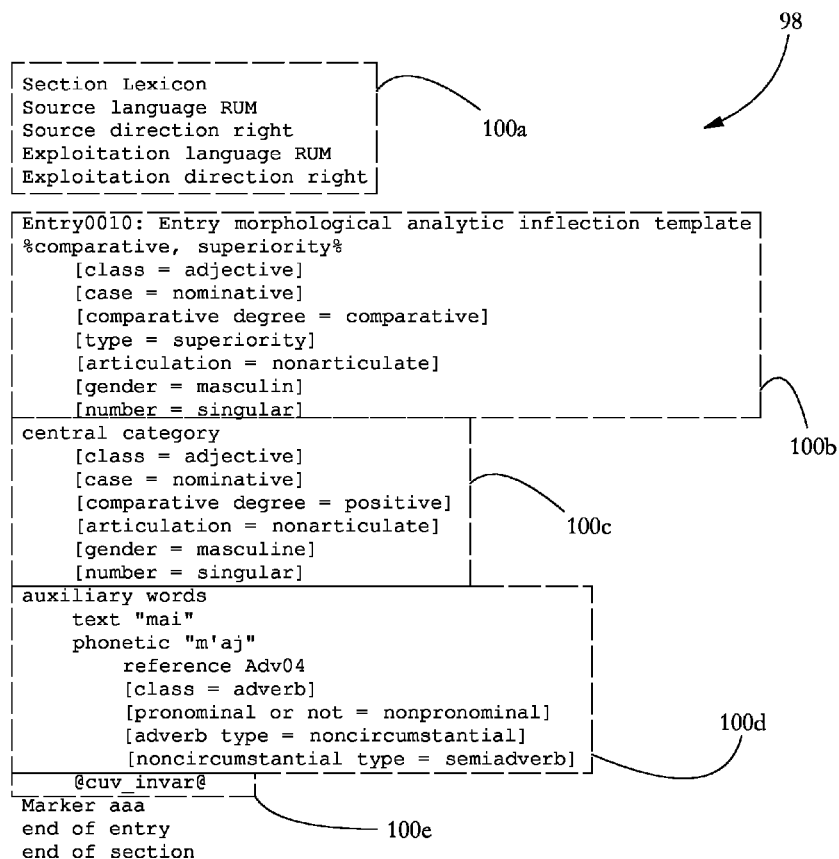
FIG. 12 illustrates an exemplary GAL encoding of a lexicon entry corresponding to an analytic inflection template according to some embodiments of the present invention.

FIG. 12 shows an exemplary inflection template lexicon entry 98 formulated in GAL and corresponding to the multiword template "mai adjective", which is the common way to construct the comparative form of adjectives in the Romanian language. Following a general GAL header 100*a*, entry 98 may comprise an inflection AVT 100*b* indicating the inflection situation of the template, a central word AVT declaration 100*c* describing grammatical properties of the central word of the template (in this case, the adjective), and an auxiliary word AVT declaration 100*d* corresponding to each auxiliary word of the template (in this case, just the particle "mai"). In some embodiments, each auxiliary word AVT declaration may indicators of various grammatical properties of the respective auxiliary word, and a relationship declaration 100*e* comprising an indicator of the syntactic relation between the central word and the respective auxiliary word of the template. FIG. 13 illustrates an exemplary XML encoding of the inflection template entry of FIG. 12, according to some embodiments of the present invention.

FIG. 14-A shows a computer-based linguistic knowledge base creation and maintenance system 1000 according to some embodiments of the present invention. System 1000 includes a plurality of client computers 1020*a-c* connected through a network 1040. Network 1040 may be a wide-area network such as the Internet. Parts of network 1040 may also include a local area network (LAN). Client computers 1020*a-c* include corresponding LKB applications 10*a-c* configured to create and update linguistic knowledge as described in detail above.

FIG. 14-B shows an alternative LKB creation and maintenance system 1100 according to some embodiments of the present invention. System 1100 includes a server 1150 connected to a plurality of client computers 1120*a-c* through a network 1140. In this embodiment, a linguistic knowledge base is stored on server 1150 and is managed by a server-side LKB application 210. System 1100 allows a plurality of client computers 1120*a-c* to remotely access and modify the LKB through client-side LKB applications 110*a-c*, respectively. In some embodiments, each client-side LKB applications 110*a-c* may include a client/server communication interface and/or an internet-based program such as a browser interface.

Figure 15:
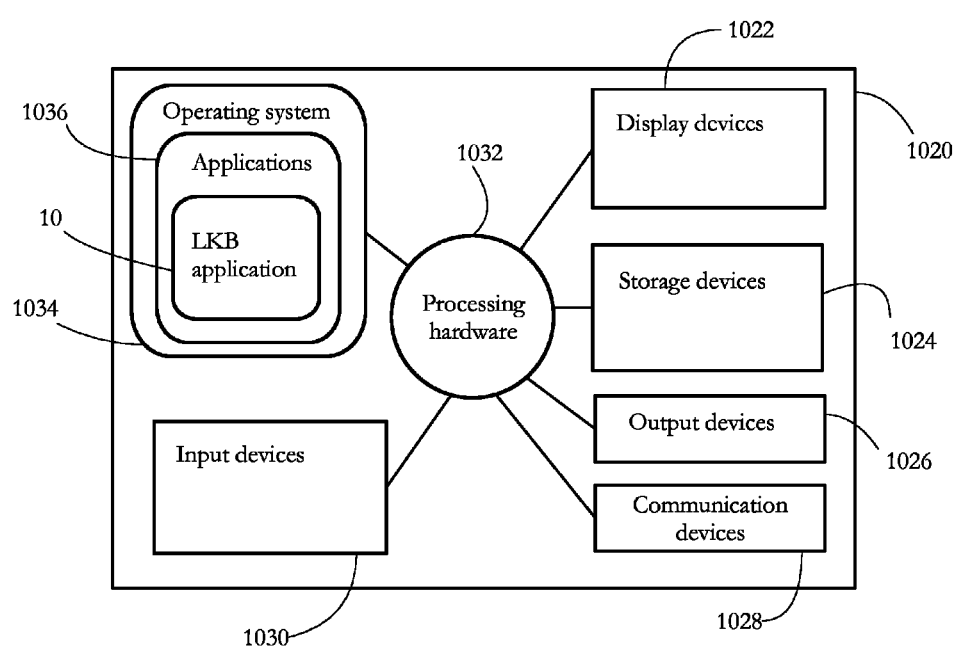
FIG. 15 shows a high-level diagram of a client computer having a LKB application, according to some embodiments of the present invention.

FIG. 15 shows a high-level diagram of a client computer 1020 hosting LKB application 10. Client computer 1020 includes storage devices 1024, input devices 1030, display devices 1022, output devices 1026, and communication devices 1028, all connected to processing hardware 1032. Operation of hardware 1032 is controlled by an operating system 1034. Storage devices 1024 include computer-readable media used for information storage and retrieval. Input devices 1030 may include computer keyboards, mice, microphones, and graphics tablets, among others. Display devices 1022 may include monitors and multimedia projectors. Output devices 1026 may include printers. Communication devices 1028 may include network adapters. A plurality of software applications 1036 may run under operating system 1034, including LKB application 10.

The exemplary systems and methods described above allow the creation and maintenance of linguistic knowledge bases containing lexical entries representing, among others, words, multiword expressions, and inflected forms of a natural language. Various embodiments of the present invention can be used in a number of computer-based linguistic applications, such as morphological analyzers, grammar and spelling checkers, thesauri, indexers, databases, search engines, as well as tools for automated or machine-assisted translation.

Figure 16:
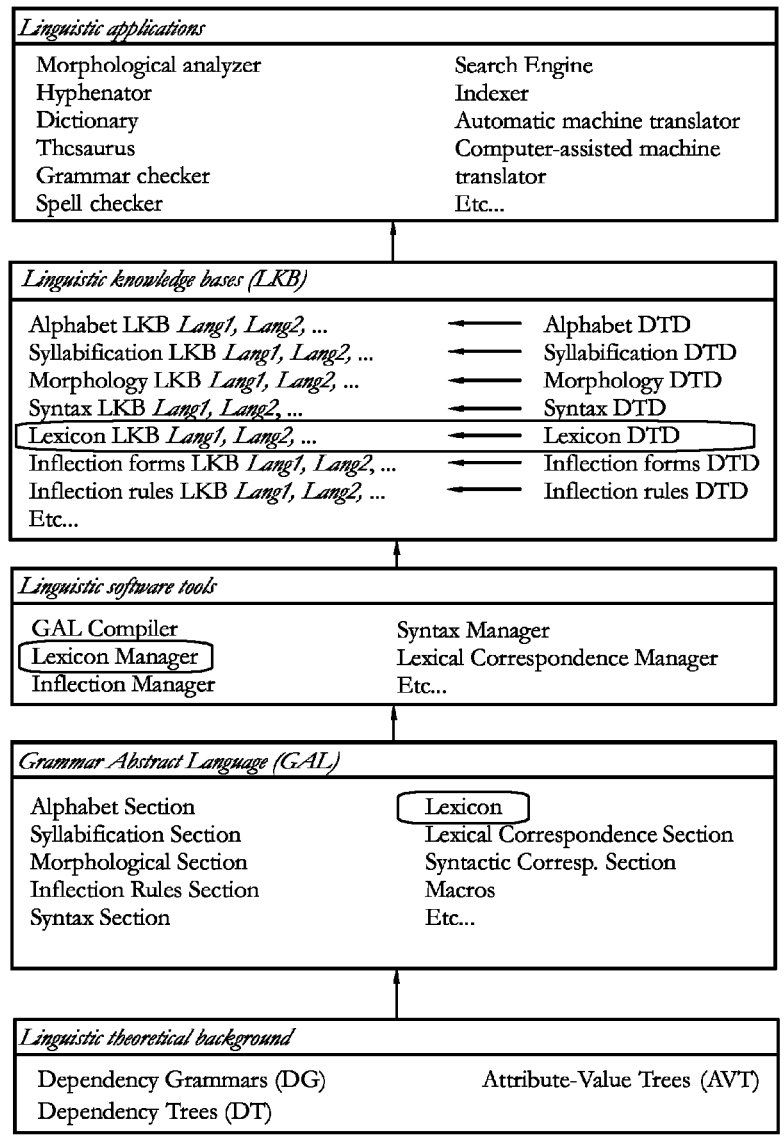
FIG. 16 shows a generic overview of LKB development and applications according to some embodiments of the present invention.

An exemplary linguistic knowledge base development environment including linguistic applications is shown in FIG. 16. Computer-based linguistic applications may be based on a theoretical background provided by a variety of linguistic representations, such as the dependency grammar models, dependency trees and attribute value trees discussed above. Starting from such grammatical representations of language, a formal grammar abstract language (GAL) may be developed. The GAL allows a systematic characterization of natural language using categories/sections such as alphabet, syllabification, morphology, syntax, inflection rules and forms, lexicon, as well as lexical, morphological, and syntactic correspondence sections. A number of linguistic software tools such as a GAL compiler and lexicon, inflection, syntax and lexical correspondence managers may be used to generate a number of linguistic knowledge bases (LKBs). For XML data, the LKBs may include associated DTDs. Exemplary LKBs may include alphabet, syllabification, morphology, syntax, inflection rules and forms, lexicon, as well as lexical, morphological, and syntactic correspondence LKBs. The LKBs may be employed in a variety of linguistic processing applications. Exemplary linguistic applications may include a morphological analyzer, hyphenator, dictionary, thesaurus, grammar and spell checker, search engine, indexer, and automatic and/or computer-assisted machine translators, among others.

In general, a grammar model may be used to generate a linguistic representation of a phrase or fragment of human communication. Some known grammar models include dependency grammars, generative grammars, and operator grammars. A linguistic representation which uses nodes and links offers a synthetic and concise image of a text fragment, reflecting the syntactic and/or logical make-up of that particular group of words. For example, in a dependency grammar model, a linguistic node may represent a grammatical entity such as a word, while a linguistic link may represent a syntactic relationship between a pair of words (e.g., coordination, subordination). In an operator grammar embodiment, a linguistic node may represent a semantic entity, while a linguistic link may represent a process (e.g., logical inference) involving a pair of linguistic nodes.

Creation of natural language LKBs is usually a time-consuming and expensive endeavor, involving the participation of expert linguists and/or personnel trained in the field of linguistics. Methods and systems described in some embodiments of the present invention allow the development of a semi-automated LKB creation environment, which facilitates the addition of lexical data to lexicon LKBs, semi-automatic conversion between various LKB formats (e.g. XML to RDB and vice versa), and visual verification and correction of lexicon data by human operators.

It will be clear to one skilled in the art that the above embodiments may be altered in many ways without departing from the scope of the invention. Accordingly, the scope of the invention should be determined by the following claims and their legal equivalents.

What is claimed is:

1. A system comprising at least one processor configured to form:
   a computer-implemented lexicon manager configured to
      receive a multiword lexicon entry for a multiword expression of a natural language, wherein the multiword lexicon entry comprises Grammar Abstract Language (GAL) code describing a dependency tree comprising a plurality of nodes, the GAL code describing an attribute-value tree for each dependency tree node, and
      in response to displaying a graphical representation of the dependency tree on a computer-implemented display device, receive a user input indicating a modification of the dependency tree, and determine an edited lexicon entry according to the multiword lexicon entry and the modification, wherein the edited lexicon entry comprises GAL code, and wherein the display device is configured to receive user input indicating modifications of the dependency tree including a dependency tree node creation, a dependency tree node deletion, an inter-node link creation, an inter-node link deletion, a modification of a type of inter-node link, and a textual annotation of a dependency tree node; and
   a GAL compiler connected to the lexicon manager and configured to compile the GAL code representing the edited lexicon entry into Extensible Markup Language (XML) code.

2. The system of claim 1, wherein the GAL compiler is further configured, in response to compiling the GAL code, to transmit the XML code to a lexicon knowledgebase stored on a computer-readable medium.

3. The system of claim 1, wherein the display device is configured to receive user input indicating modifications of an attribute value tree including replacing a value of an attribute node of the attribute value tree and providing a missing value to an attribute node of the attribute value tree.

4. A computer-implemented method comprising employing at least one processor to perform the steps of:
   receiving a multiword lexicon entry for a multiword expression of a natural language, wherein the multiword lexicon entry comprises Grammar Abstract Language (GAL) code describing a dependency tree comprising a plurality of nodes, the GAL code describing an attribute-value tree for each dependency tree node;
   in response to displaying a graphical representation of the dependency tree on a computer-implemented display device, receiving a user input indicating a modification of the dependency tree, and determining an edited lexicon entry according to the multiword lexicon entry and the modification, wherein the edited lexicon entry comprises GAL code, and wherein the display device is configured to receive user input indicating modifications of the dependency tree including a dependency tree node creation, a dependency tree node deletion, an inter-node link creation, an inter-node link deletion, a modification of a type of inter-node link, and a textual annotation of a dependency tree node; and
   compiling the GAL code representing the edited lexicon entry into Extensible Markup Language (XML) code.

5. The system of claim 4, further comprising, in response to compiling the GAL code, transmitting the XML code to a lexicon knowledgebase stored on a computer-readable medium.

6. The method of claim 4, wherein the display device is configured to receive user input indicating modifications of an attribute value tree including replacing a value of an attribute node of the attribute value tree and providing a missing value to an attribute node of the attribute value tree.

7. A system comprising at least one processor configured to form:
   a computer-implemented lexicon manager configured to
      receive a multiword expression formulated in a natural language,
      perform a syntactic analysis of the multiword expression to produce a dependency tree of the multiword expression, the dependency tree comprising a plurality of nodes,
      formulate a lexicon entry of the multiword expression in Grammar Abstract Language (GAL) code, the lexicon entry comprising the dependency tree, the GAL code describing an attribute-value tree for each dependency tree node, and
      in response to displaying a graphical representation of the dependency tree on a computer-implemented display device, receive a user input indicating a modification of the dependency tree, and determine an edited lexicon entry according to the multiword lexicon entry and the modification, wherein the edited lexicon entry comprises GAL code, and wherein the display device is configured to receive user input indicating modifications of the dependency tree including a dependency tree node creation, a dependency tree node deletion, an inter-node link creation, an inter-node link deletion, a modification of a type of inter-node link, and a textual annotation of a dependency tree node; and a GAL compiler connected to the lexicon manager and configured to compile the GAL representing the edited lexicon entry code into Extensible Markup Language (XML) code.

8. The system of claim 7, wherein the GAL compiler is further configured, in response to compiling the GAL code, to transmit the XML code to a lexicon knowledgebase stored on a computer-readable medium.

9. The system of claim 7, wherein the display device is configured to receive user input indicating modifications of an attribute value tree including replacing a value of an attribute node of the attribute value tree and providing a missing value to an attribute node of the attribute value tree.

10. A computer-implemented method comprising employing at least one processor to:
perform a syntactic analysis of a multiword expression formulated in a natural language to produce a dependency tree of the multiword expression, the dependency tree including a plurality of nodes;
formulate a lexicon entry of the multiword expression in Grammar Abstract Language (GAL) code, the lexicon entry comprising the dependency tree, the GAL code describing an attribute-value tree for each dependency tree node;
in response to displaying a graphical representation of the dependency tree on a computer-implemented display device, receive a user input indicating a modification of the dependency tree, and determine an edited lexicon entry according to the multiword lexicon entry and the modification, wherein the edited lexicon entry comprises GAL code, and wherein the display device is configured to receive user input indicating modifications of the dependency tree including a dependency tree node creation, a dependency tree node deletion, an inter-node link creation, an inter-node link deletion, a modification of a type of inter-node link, and a textual annotation of a dependency tree node; and
compile the GAL code representing the edited lexicon entry into Extensible Markup Language (XML) code.

11. The method of claim 10, further comprising, in response to compiling GAL code, transmitting the XML code to a lexicon knowledgebase stored on a computer-readable medium.

12. The method of claim 10, wherein the display device is configured to receive user input indicating modifications of an attribute value tree including replacing a value of an attribute node of the attribute value tree and providing a missing value to an attribute node of the attribute value tree.

13. A system comprising at least one processor configured to form:
means for receiving a multiword lexicon entry for a multiword expression of a natural language, wherein the multiword lexicon entry comprises Grammar Abstract Language (GAL) code describing a dependency tree comprising a plurality of nodes, the GAL code describing an attribute-value tree for each dependency tree node;
means for displaying to a user a graphical representation of the dependency tree in response to receiving the multiword lexicon entry;
means for receiving a user input indicating a modification of the dependency tree in response to displaying the dependency tree, wherein the means for receiving the user input is configured to receive user input indicating modifications of the dependency tree including a dependency tree node creation, a dependency tree node deletion, an inter-node link creation, an inter-node link deletion, a modification of a type of inter-node link, and a textual annotation of a dependency tree node;
means for determining an edited lexicon entry according to the multiword lexicon entry and the modification, wherein the edited lexicon entry comprises GAL code; and
means for compiling the GAL representing the edited lexicon entry code into Extensible Markup Language (XML) code.

14. The system of 13, further comprising means for receiving a user input indicating modifications of an attribute value tree including replacing a value of an attribute node of the attribute value tree and providing a missing value to an attribute node of the attribute value tree.

* * * * *